(12) United States Patent
Park et al.

(10) Patent No.: US 11,288,549 B2
(45) Date of Patent: Mar. 29, 2022

(54) METHOD AND APPARATUS FOR IMAGE ANALYSIS USING IMAGE CLASSIFICATION MODEL

(71) Applicant: SAMSUNG SDS CO., LTD., Seoul (KR)

(72) Inventors: Jeong Hyung Park, Seoul (KR); Young Rock Oh, Seoul (KR); Hyung Sik Jung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 23 days.

(21) Appl. No.: 16/884,899

(22) Filed: May 27, 2020

(65) Prior Publication Data

US 2021/0357700 A1    Nov. 18, 2021

(30) Foreign Application Priority Data

May 15, 2020   (KR) .................. 10-2020-0058434

(51) Int. Cl.
*G06K 9/62* (2006.01)
(52) U.S. Cl.
CPC .......... *G06K 9/6262* (2013.01); *G06K 9/627* (2013.01); *G06K 9/6215* (2013.01)

(58) Field of Classification Search
CPC ..... G06K 9/6262; G06K 9/6215; G06K 9/627
USPC ........................................................ 382/159
See application file for complete search history.

(56) References Cited

U.S. PATENT DOCUMENTS

2018/0260957 A1*   9/2018   Yang ..................... G06T 7/0012
2020/0012898 A1*   1/2020   Zhao ..................... G06N 5/046

FOREIGN PATENT DOCUMENTS

KR    10-2019-0134933 A    12/2019

* cited by examiner

*Primary Examiner* — Ayodeji O Ayotunde
(74) *Attorney, Agent, or Firm* — The PL Law Group, PLLC

(57) ABSTRACT

A method for image analysis according to an embodiment may include generating a prediction result for an original image using a pre-trained image classification model, learning a plurality of masks using the original image, the prediction result, and the image classification model, and generating a map visualizing a importance of each area of the original image for the prediction result based on at least one of the plurality of masks.

18 Claims, 4 Drawing Sheets

METHOD AND APPARATUS FOR IMAGE ANALYSIS USING IMAGE CLASSIFICATION MODEL

CROSS REFERENCE TO RELATED APPLICATIONS AND CLAIM OF PRIORITY

This application claims the benefit of Korean Patent Application No. 10-2020-0058434 filed on May 15, 2020 in the Korean Intellectual Property Office, the disclosure of which is incorporated herein by reference in its entirety.

TECHNICAL FIELD

The disclosed embodiments relate to image analysis technology.

BACKGROUND ART OF THE INVENTION

Deep neural network models are used in various fields such as image, voice, text and the like, and they are rapidly developing. As a prediction result of the neural network model is grafted into real-life application, the demand for reasonably explaining the prediction result of the model is also steadily increasing. In particular, it is more important to accurately explain the prediction result in the fields that require perfect predictive performance, such as medical care, autonomous driving, and the like. For example, if it is possible to find a portion of input data having a large importance for the prediction result of the model, it will be very helpful for a user to understand the prediction result of the model.

On the other hand, in an image classification model, conventional techniques for generating a saliency map which represents the importance of each pixel of an input image require an excessively high amount of computation or generate a saliency map using only limited information, and hence there is a limit in the accuracy or interpretability of the generated saliency map.

SUMMARY

The disclosed embodiments are intended to provide a method and apparatus for image analysis.

A method for image analysis according to one embodiment includes generating a prediction result for an original image using a pre-trained image classification model; learning a plurality of masks using the original image, the prediction result, and the image classification model; and generating a map, which visualizes a importance of each area of the original image for the prediction result, based on at least one of the plurality of masks.

The plurality of masks may include a positive mask and a negative mask, and the learning may include learning the positive mask based on a prediction result of the image classification model for an image generated by applying the positive mask to the original image, the prediction result for the original image, and a similarity between the positive mask and the negative mask and learning the negative mask based on a prediction result of the image classification model for an image generated by applying the negative mask to the original image, the prediction result for the original image, and the similarity.

The learning may include learning the positive mask such that the prediction result of the image classification model for the image generated by applying the positive mask is similar to the prediction result for the original image and the similarity between the positive mask and the negative mask decreases, and learning the negative mask such that the prediction result of the image classification model for the image generated by applying the negative mask is different from the prediction result for the original image and the similarity decreases.

The generating of the map may include generating the map based on the positive mask.

The plurality of masks may include a primary mask for the original image and an auxiliary mask for each of one or more transformed images for the original image.

The learning may include learning the primary mask based on a prediction result of the image classification model for an image generated by applying the primary mask to the original image and the prediction result for the original image; generating the one or more transformed images; learning the auxiliary mask for each of the one or more transformed images based on a prediction result of the image classification model for each of one or more images generated by applying the auxiliary mask to each of the one or more transformed images and the prediction result for the original image; transforming the auxiliary mask for each of the one or more transformed images using an inverse operation for a transform operation that is applied to the original image to generate each of the one or more transformed images; and updating the learned primary mask based on the transformed auxiliary mask for each of the one or more transformed images.

The learning of the primary mask may include learning the primary mask such that the prediction result of the image classification model for the image generated by applying the primary mask is similar to the prediction result for the original image and the learning of the auxiliary mask comprises learning the auxiliary mask for each of the one or more transformed images such that the prediction result of the image classification model for each of the one or more images generated by applying the auxiliary mask is similar to the prediction result for the original image.

The updating may include updating the learned primary mask based on similarity between the learned primary mask and the transformed auxiliary mask for each of the one or more transformed images.

The updating may include updating the learned primary mask such that an average of the similarities increases.

The generating of the map may include generating the map based on the updated mask.

An apparatus for image analysis according to one embodiment may include a mask learner configured to generate a prediction result for an original image using a pre-trained image classification model and learn a plurality of masks using the original image, the prediction result, and the image classification model; and a map generator configured to generate a map, which visualizes a importance of each area of the original image for the prediction result, based on at least one of the plurality of masks.

The plurality of masks may include a positive mask and a negative mask, and the mask learner may learn the positive mask based on a prediction result of the image classification model for an image generated by applying the positive mask to the original image, the prediction result for the original image, and a similarity between the positive mask and the negative mask, and learn the negative mask based on a prediction result of the image classification model for an image generated by applying the negative mask to the original image, the prediction result for the original image, and the similarity.

The mask learner may learn the positive mask such that the prediction result of the image classification model for the image generated by applying the positive mask is similar to the prediction result for the original image and the similarity decreases, and learn the negative mask such that the prediction result of the image classification model for the image generated by applying the negative mask is different from the prediction result for the original image and the similarity decreases.

The map generator may generate the map based on the positive mask.

The plurality of masks may include a primary mask for the original image and an auxiliary mask for each of one or more transformed images for the original image.

The mask learner may learn the primary mask based on a prediction result of the image classification model for an image generated by applying the primary mask to the original image and the prediction result for the original image, generate the one or more transformed images, learn the auxiliary mask for each of the one or more transformed images based on a prediction result of the image classification model for each of one or more images generated by applying the auxiliary mask to each of the one or more transformed images and the prediction result for the original image, transform the auxiliary mask for each of the one or more transformed images using an inverse operation for a transform operation that is applied to the original image to generate each of the one or more transformed images, and update the learned primary mask based on the transformed auxiliary mask for each of the one or more transformed images.

The mask learner may learn the primary mask such that the prediction result of the image classification model for the image generated by applying the primary mask is similar to the prediction result for the original image, and learn the auxiliary mask for each of the one or more transformed images such that the prediction result of the image classification model for each of the one or more images generated by applying the auxiliary mask is similar to the prediction result for the original image.

The mask learner may update the learned primary mask based on similarity between the learned primary mask and the transformed auxiliary mask for each of the one or more transformed images.

The mask learner may update the learned primary mask such that an average of the similarities increases.

The map generator may generate the map based on the updated mask.

According to the disclosed embodiments, the importance of each area of an original image for a prediction result of an image classification model is visualized based on a plurality of masks learned in various ways using the original image and the prediction result of the image classification model for the original image, so that it is possible to analyze the importance of each area of the original image from various perspectives and to improve the accuracy of the visualized importance of each area.

DETAILED DESCRIPTION OF THE INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
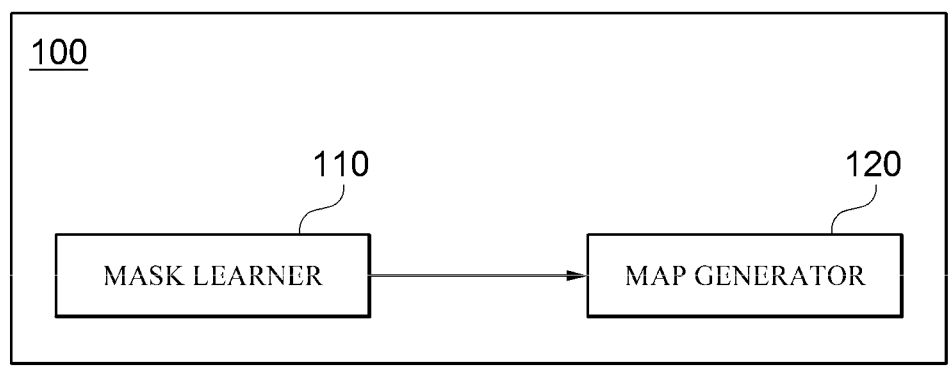
FIG. 1 is a diagram illustrating a configuration of an apparatus for image analysis according to one embodiment.

FIG. 1 is a diagram illustrating a configuration of an apparatus for image analysis according to one embodiment.

The apparatus 100 for image analysis according to one embodiment includes a mask learner 110 and a map generator 120.

In one embodiment, the mask learner 110 and the map generator 120 may be implemented using one or more physically separated devices, or may be implemented by combining one or more processors, or combining one or more processors and software, and, unlike the illustrated example, specific operations thereof may not be clearly distinguished.

The mask learner 110 generates a prediction result for an original image using a pre-trained image classification model and learns a plurality of masks using the original image, the prediction result of the image classification model for the original image, and the image classification model.

In this case, according to one embodiment, the image classification model may be, for example, a deep neural network model trained to classify an input image into one of a plurality of classes.

For example, the image classification model may be, for example, a deep neural network based multi-class classification model using a softmax function as an activation function of an output layer.

In another example, the image classification model may be, for example, a deep neural network-based binary classification model using a sigmoid function as an activation function of an output layer.

However, the neural network structure of the image classification model and the activation function of the output layer are not necessarily limited to specific examples, and may be variously modified according to embodiments.

According to one embodiment, the mask means a weight matrix including a weight for a pixel value of each pixel included in an image to which the mask is to be applied, and the weight may have a value between, for example, 0 and 1.

For example, when image A to which a mask is to be applied is an image composed of n×m pixels, mask M for the image A may be a weight matrix including n×m weights. In addition, image A' generated by applying the mask M to the image A may be generated, for example, through element-wise multiplication between a matrix of pixel values for each pixel included in the image A and the mask M as shown in Equation 1 below.

$$A' = \phi(A, M) =$$

$$A \odot M = \begin{bmatrix} a_{1,1} & \cdots & a_{1,m} \\ \vdots & \ddots & \vdots \\ a_{n,1} & \cdots & a_{n,m} \end{bmatrix} \odot \begin{bmatrix} w_{1,1} & \cdots & w_{1,m} \\ \vdots & \ddots & \vdots \\ w_{n,1} & \cdots & w_{n,m} \end{bmatrix} =$$

$$\begin{bmatrix} a_{1,1} \cdot w_{1,1} & \cdots & a_{1,m} \cdot w_{1,m} \\ \vdots & \ddots & \vdots \\ a_{n,1} \cdot w_{n,1} & \cdots & a_{n,m} \cdot w_{n,m} \end{bmatrix}$$

[Equation 1]

Here, $a_{i,j}$ is a pixel value of a pixel whose coordinates are $\{i, j\}$ among pixels of image A, and $w_{i,j}$ is a weight for a pixel whose coordinates are $\{i, j\}$ among the pixels of the image A.

The map generator 120 may generate a map visualizing the importance of each area of the original image for the prediction result of the image classification model based on at least one of the plurality of masks learned by the mask learner 110.

In this case, the importance of each area may be, for example, the importance of each pixel, or the importance of each pixel group (e.g., superpixel) including one or more pixels, and may be calculated by the map generator 120 based on the weight included in at least one of the plurality of learned masks.

The map generated by the map generator 120 may be, for example, a saliency map, but is not necessarily limited to a specific form, and the method of generating the map is also not limited to a specific method.

Hereinafter, a specific embodiment of the mask learning process performed by the mask learner 110 will be described in detail.

First Embodiment

Figure 2:
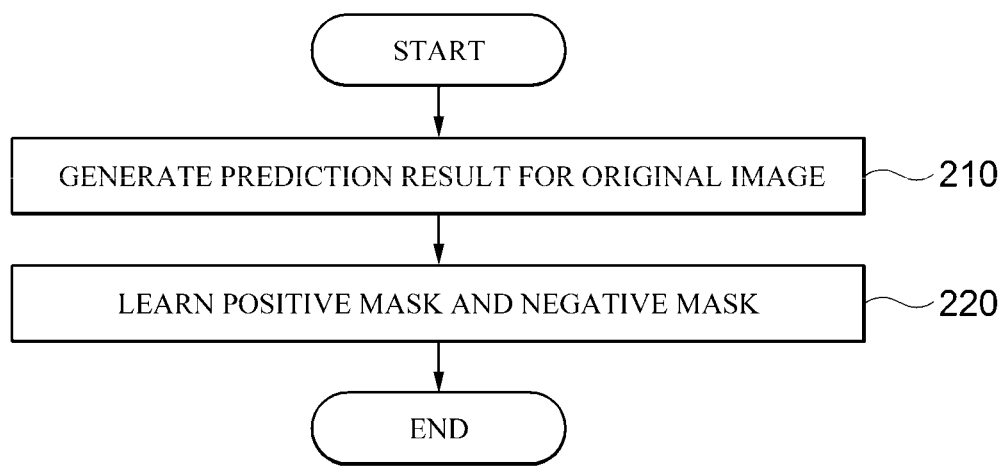
FIG. 2 is a flowchart illustrating a mask learning process according to a first embodiment.

FIG. 2 is a flowchart illustrating a mask learning process according to a first embodiment.

Referring to FIG. 2, first, the mask learner 110 generates a prediction result for the original image using a pre-trained image classification model (210).

Thereafter, the mask learner 110 learns a positive mask and a negative mask using the original image, the prediction result of the image classification model for the original image, and the image classification model (220).

In this case, the positive mask may mean a mask that is learned to have a high weight value for a pixel, among pixels of the original image, positively affecting the prediction result of the image classification model for the original image.

Also, the negative mask may mean a mask that is learned to have a high weight value for a pixel, among pixels of the original image, negatively affecting the prediction result of the image classification model for the original image.

According to one embodiment, the mask learner 110 may learn the positive mask based on a prediction result of the image classification model for an image generated by applying the positive mask to the original image, the prediction result of the image classification model for the original image, and the similarity between the positive mask and the negative mask.

In addition, the mask learner 110 may learn the negative mask based on a prediction result of the image classification model for an image generated by applying the negative mask to the original image, the prediction result of the image classification model for the original image, and the similarity between the positive mask and the negative mask.

Specifically, the mask learner 110 may learn the positive mask such that the prediction result of the image classification model for the image generated by applying the positive mask to the original image is similar to the prediction result of the image classification model for the original image and at the same time the similarity to the negative mask decreases.

Also, the mask learner 110 may learn the negative mask such that the prediction result of the image classification model for the image generated by applying the negative mask to the original image is different from the prediction result for the original image and at the same time the similarity to the positive mask decreases.

For example, assuming that the image classification model is a multi-class classification model using a softmax function as an activation function of an output layer and the original image is classified as class c by the image classification model, the mask learner 110 may learn the positive mask, for example, by repeatedly updating the positive mask using a backpropagation algorithm based on a loss function defined as shown in Equation 2. In addition, the mask learner 110 may learn the negative mask by repeatedly updating the negative mask using a backpropagation algorithm based on a loss function defined as shown in Equation 3.

$$L^+(M^+) = \lambda_{TV} TV(M^+) + \lambda_{L1} \|M^+\|_1 - f_c(\phi(X, M^+)) - \lambda_s S(M^+, 1-M^-)$$ [Equation 2]

$$L^-(M^-) = \lambda_{TV} TV(M^-) + \lambda_{L1} \|1 - M^-\|_1 + f_c(\phi(X, M^-)) - \lambda_s S(M^+, 1-M^-)$$ [Equation 3]

Meanwhile, in Equations 2 and 3, $L^+(M^+)$ denotes a loss function for learning a positive mask, $L^-(M^-)$ denotes a loss function for learning a negative mask, X denotes an original image, $M^+$ denotes the positive mask, $M^-$ denotes the negative mask, $\|\cdot\|_1$ denotes L1 norm, $\phi(X, M^+)$ denotes an image generated by applying the positive mask to the original image, $f_c(\phi(X, M^+))$ denotes a probability of a class of $\phi(X, M^+)$ being class c as a prediction result of the image classification model for $\phi(X, M^+)$, $\phi(X, M^-)$ denotes an image generated by applying the negative mask to the original image, $f_c(\phi(X, M^-))$ denotes a probability of a class of $\phi(X, M^-)$ being class c as a prediction result of the image classification model for $\phi(X, M^-)$.

In addition, $\lambda_{TV}$, $\lambda_{L1}$ and $\lambda_s$ each denote a preset coefficient.

In addition, TV(·) denotes a total variance of the mask, and, for example, the total variance of mask M may be defined as shown in Equation 4 below.

$$TV(M) = \sum_{i,j}(w_{i,j} - w_{i,j+1})^2 + \sum_{i,j}(w_{i,j} - w_{i+1,j})^2$$ [Equation 4]

In addition, $S(M^+, 1-M^-)$ denotes the similarity between $M^+$ and $1-M^-$, and may be, for example, cosine similarity, $L_p$ (where p is a natural number) norm, or the like.

The loss functions used for learning the positive mask and the negative mask are not limited to the examples described above, and may be variously modified according to embodiments.

On the other hand, according to one embodiment, when the learning of the positive mask and the negative mask is completed, the map generator 120 may generate a map visualizing the importance of each area of the original image for the prediction result of the image classification model for the original image, based on the learned positive mask.

Meanwhile, in the flowchart illustrated in FIG. 2, at least some of the operations may be performed in different order or may be combined into fewer operations or further divided into more operations. In addition, some of the operations may be omitted, or one or more extra operations, which are not illustrated, may be added to the flowchart and be performed.

Second Embodiment

Figure 3:
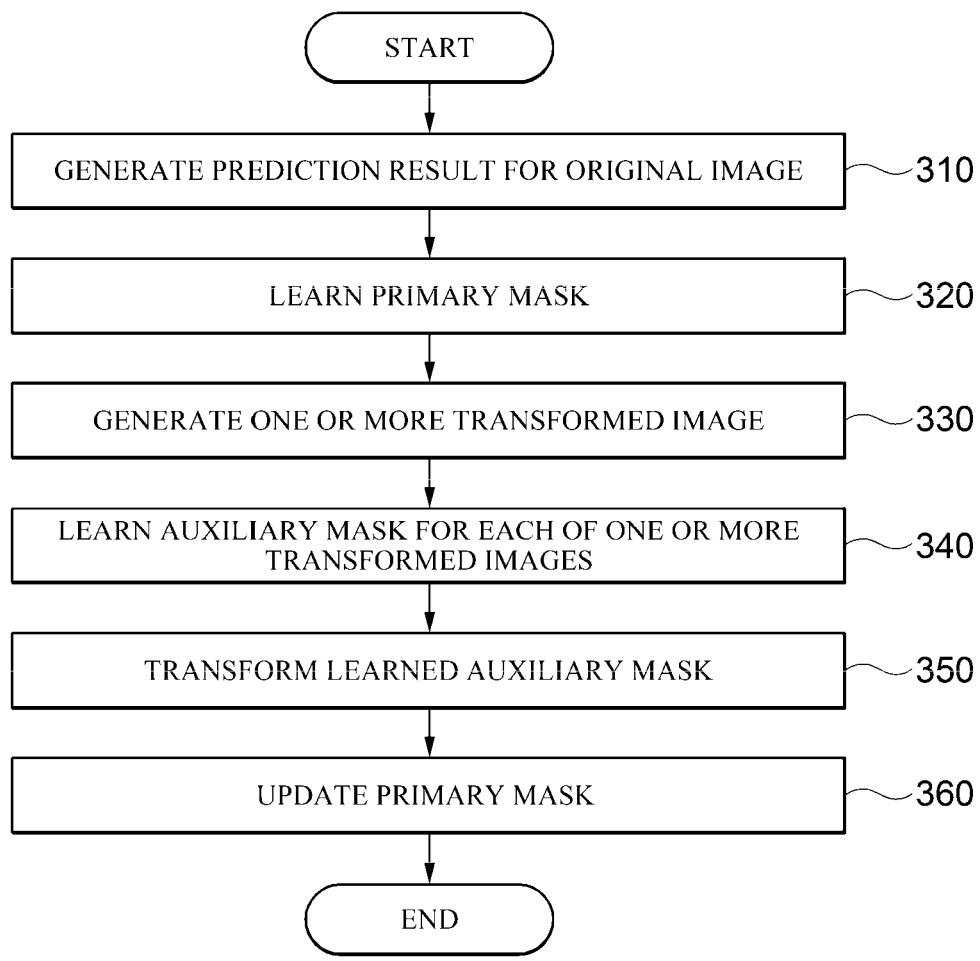
FIG. 3 is a flowchart illustrating a mask learning process according to a second embodiment.

FIG. 3 is a flowchart illustrating a mask learning process according to a second embodiment.

Referring to FIG. 3, first, the mask learner 110 generates a prediction result for the original image using a pre-trained image classification model (310).

Thereafter, the mask learner 110 learns a primary mask using the original image, the prediction result of the image classification model for the original image, and the image classification model (320).

In this case, according to one embodiment, the mask learner 110 may learn the primary mask based on a prediction result of the image classification model for an image generated by applying the primary mask to the original image and the prediction result of the image classification model for the original image.

Specifically, the mask learner 110 may learn the primary mask such that the prediction result of the image classification model for the image generated by applying the primary mask to the original image is similar to the prediction result of the image classification model for the original image.

For example, assuming that the image classification model is a multi-class classification model using a softmax function as an activation function of an output layer and the original image is classified as class c by the image classification model, the mask learner 110 may learn primary mask M', for example, by repeatedly updating the primary mask M' using a backpropagation algorithm based on a loss function defined as shown in Equation 5.

$$L(M')=\lambda_{TV}TV(M')+\lambda_{L1}\|M'\|_1-f_c(\phi(X,M'))$$ [Equation 5]

Thereafter, the mask learner 110 generates one or more transformed images for the original image (330).

In this case, the transformed image for the original image means an image generated by transforming the original image using a transform operation, such as, for example, rotation, up-and-down reverse, left-and-right reverse, enlargement, shrinkage, and the like.

Meanwhile, the mask learner 110 may generate one or more transformed images by applying different transform operations to the original image.

For example, the $n^{th}$ transformed image $X_n$ among the one or more transformed images for the original image X may be generated by, for example, Equation 6 below.

$$X_n=T_n(X)$$ [Equation 6]

Here, $T_n(\cdot)$ denotes the transform operation applied to the original image X to generate the $n^{th}$ transformed image $X_n$.

Thereafter, the mask learner 110 learns an auxiliary mask for each of the one or more transformed images using one or more transformed images, the prediction result of the image classification model for the original image, and the image classification model (340).

In this case, according to one embodiment, the mask learner 110 may learn the auxiliary mask for each of the one or more transformed images based on a prediction result of the image classification model for each of one or more images generated by applying the auxiliary mask to each of the one or more transformed images and the prediction result of the image classification model for the original image.

Specifically, the mask learner 110 may learn the auxiliary mask for each of the transformed images such that the prediction result of the image classification model for each of the one or more images generated by applying the auxiliary mask to each of the one or more transformed images is similar to the prediction result of the image classification model for the original image.

For example, assuming that the image classification model is a multi-class classification model using a softmax function as an activation function of an output layer and the original image is classified as class c by the image classification model, the mask learner 110 may learn the auxiliary mask for each transformed image, for example, by repeatedly updating the auxiliary mask for each of the transformed images using a backpropagation algorithm based on a loss function defined as shown in Equation 7.

$$L(M_n)=\lambda_{TV}TV(M_n)+\lambda_{L1}\|M_n\|_1-f_c(\phi(X_n,M_n))$$ [Equation 7]

In Equation 7, $M_n$ (where n is a natural number greater than 1) denotes an auxiliary mask for the $n^{th}$ transformed image $X_n$.

Thereafter, the mask learner 110 transforms each auxiliary mask by applying an inverse operation for the transform operation that is applied to the original image to generate each of the one or more transformed images to the auxiliary mask for each transformed image (350).

For example, the mask learner 110 may generate transformed auxiliary mask $M_n'$ by applying inverse operation $T_n^{-1}(\cdot)$ for transform operation $T_n(\cdot)$ that is applied to the original image to generate the $n^{th}$ transformed image to the auxiliary mask $M_n$ for the $n^{th}$ transformed image as shown in Equation 8 below.

$$M'_n=T_n^{-1}(M_n)$$ [Equation 8]

Then, the mask learner 110 may update the primary mask based on the transformed auxiliary mask for each of the one or more transformed images (360).

According to one embodiment, the mask learner 110 may update the primary mask based on the similarity between the primary mask and each of the transformed auxiliary masks. In this case, the similarity may be, for example, cosine similarity, Lp norm, or the like.

Specifically, the mask learner 110 may update the primary mask such that the average of calculated similarities between the primary image and each of the auxiliary masks increases.

Meanwhile, according to one embodiment, when the update of the primary mask is completed, the map generator 120 may generate a map visualizing the importance of each area of the original image for the prediction result of the image classification model for the original image, based on the updated primary mask.

Meanwhile, in the flowchart illustrated in FIG. 3, at least some of the operations may be performed in different order or may be combined into fewer operations or further divided into more operations. In addition, some of the operations may be omitted, or one or more extra operations, which are not illustrated, may be added to the flowchart and be performed.

Figure 4:
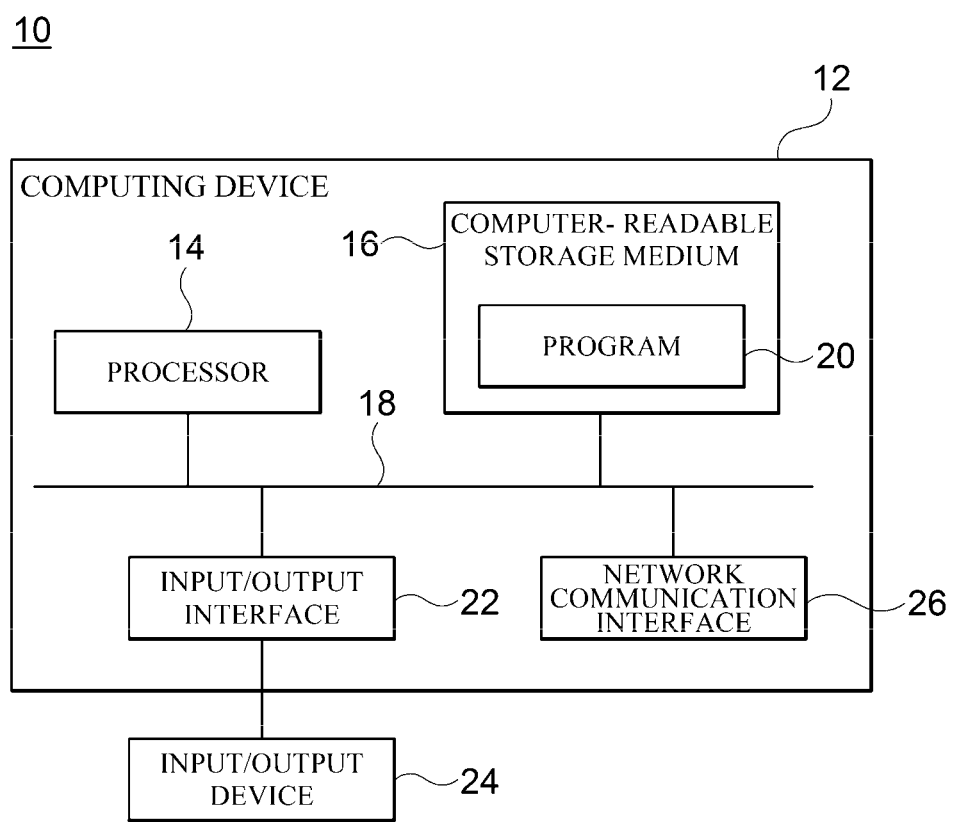
FIG. 4 is a block diagram for describing an example of a computing environment including a computing device according to one embodiment.

FIG. 4 is a block diagram for describing an example of a computing environment including a computing device according to one embodiment.

In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in an apparatus 100 for image analysis. The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A method for image analysis comprising:
generating a prediction result for an original image using a pre-trained image classification model;
learning a plurality of masks using the original image, the prediction result, and the image classification model; and
generating a map visualizing a importance of each area of the original image for the prediction result based on at least one of the plurality of masks,
wherein the plurality of masks comprise (i) a positive mask and a negative mask, or (ii) a primary mask for the original image and an auxiliary mask for each of one or more transformed images for the original image;
the positive mask is learned to have a high weight value for pixels that have a positive effect on the prediction result of the image classification model for the original image among pixels of the original image; and
the negative mask is learned to have a high weight value for pixels that have a negative effect on the prediction result of the image classification model for the original image among pixels of the original image.

2. The method of claim 1, wherein
the learning comprises learning the positive mask based on a prediction result of the image classification model for an image generated by applying the positive mask to the original image, the prediction result for the original image, and a similarity between the positive mask and the negative mask and learning the negative mask based on a prediction result of the image classification model for an image generated by applying the negative mask to the original image, the prediction result for the original image, and the similarity.

3. The method of claim 2, wherein the learning comprises learning the positive mask such that the prediction result of the image classification model for the image generated by applying the positive mask is similar to the prediction result for the original image and the similarity decreases, and learning the negative mask such that the prediction result of the image classification model for the image generated by applying the negative mask is different from the prediction result for the original image and the similarity decreases.

4. The method of claim 2, wherein the generating of the map comprises generating the map based on the positive mask.

5. The method of claim 1, wherein the learning comprises:
learning the primary mask based on a prediction result of the image classification model for an image generated by applying the primary mask to the original image and the prediction result for the original image;
generating the one or more transformed images;
learning the auxiliary mask for each of the one or more transformed images based on a prediction result of the image classification model for each of one or more images generated by applying the auxiliary mask to each of the one or more transformed images and the prediction result for the original image;
transforming the auxiliary mask for each of the one or more transformed images using an inverse operation for a transform operation that is applied to the original image to generate each of the one or more transformed images; and updating the learned primary mask based on the transformed auxiliary mask for each of the one or more transformed images.

6. The method of claim 5, wherein the learning of the primary mask comprises learning the primary mask such that the prediction result of the image classification model for the image generated by applying the primary mask is similar to the prediction result for the original image; and the learning of the auxiliary mask comprises learning the auxiliary mask for each of the one or more transformed images such that the prediction result of the image classification model for each of the one or more images generated by applying the auxiliary mask is similar to the prediction result for the original image.

7. The method of claim 5, wherein the updating comprises updating the learned primary mask based on similarity between the learned primary mask and the transformed auxiliary mask for each of the one or more transformed images.

8. The method of claim 7, wherein the updating comprises updating the learned primary mask such that an average of the similarities increases.

9. The method of claim 5, wherein the generating of the map comprises generating the map based on the updated mask.

10. An apparatus for image analysis comprising:
a mask learner configured to generate a prediction result for an original image using a pre-trained image classification model and learn a plurality of masks using the original image, the prediction result, and the image classification model; and
a map generator configured to generate a map visualizing a importance of each area of the original image for the prediction result based on at least one of the plurality of masks,
wherein the plurality of masks comprise (i) a positive mask and a negative mask, or (ii) a primary mask for the original image and an auxiliary mask for each of one or more transformed images for the original image;
the positive mask is learned to have a high weight value for pixels that have a positive effect on the prediction result of the image classification model for the original image among pixels of the original image; and
the negative mask is learned to have a high weight value for pixels that have a negative effect on the prediction result of the image classification model for the original image among pixels of the original image.

11. The apparatus of claim 10, wherein
the mask learner is further configured to:
learn the positive mask based on a prediction result of the image classification model for an image generated by applying the positive mask to the original image, the prediction result for the original image, and a similarity between the positive mask and the negative mask; and
learn the negative mask based on a prediction result of the image classification model for an image generated by applying the negative mask to the original image, the prediction result for the original image, and the similarity.

12. The apparatus of claim 11, wherein the mask learner is further configured to:

learn the positive mask such that the prediction result of the image classification model for the image generated by applying the positive mask is similar to the prediction result for the original image and the similarity decreases; and learn the negative mask such that the prediction result of the image classification model for the image generated by applying the negative mask is different from the prediction result for the original image and the similarity decreases.

13. The apparatus of claim 11, wherein the map generator is further configured to generate the map based on the positive mask.

14. The apparatus of claim 10, wherein the mask learner is further configured to:

learn the primary mask based on a prediction result of the image classification model for an image generated by applying the primary mask to the original image and the prediction result for the original image;

generate the one or more transformed images;

learn the auxiliary mask for each of the one or more transformed images based on a prediction result of the image classification model for each of one or more images generated by applying the auxiliary mask to each of the one or more transformed images and the prediction result for the original image;

transform the auxiliary mask for each of the one or more transformed images using an inverse operation for a transform operation that is applied to the original image to generate each of the one or more transformed images; and update the learned primary mask based on the transformed auxiliary mask for each of the one or more transformed images.

15. The apparatus of claim 14, wherein the mask learner is further configured to:

learn the primary mask such that the prediction result of the image classification model for the image generated by applying the primary mask is similar to the prediction result for the original image; and learn the auxiliary mask for each of the one or more transformed images such that the prediction result of the image classification model for each of the one or more images generated by applying the auxiliary mask is similar to the prediction result for the original image.

16. The apparatus of claim 14, wherein the mask learner is further configured to update the learned primary mask based on similarity between the learned primary mask and the transformed auxiliary mask for each of the one or more transformed images.

17. The apparatus of claim 16, wherein the mask learner is further configured to update the learned primary mask such that an average of the similarities increases.

18. The apparatus of claim 14, wherein the map generator is further configured to generate the map based on the updated mask.

* * * * *